(12) United States Patent
Newstadt et al.

(10) Patent No.: US 7,886,053 B1
(45) Date of Patent: Feb. 8, 2011

(54) SELF-MANAGEMENT OF ACCESS CONTROL POLICY

(75) Inventors: Keith Newstadt, Newton, MA (US);
Douglas Gibson, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 16 days.

(21) Appl. No.: 12/560,388

(22) Filed: Sep. 15, 2009

(51) Int. Cl.
*G06F 15/173* (2006.01)
(52) U.S. Cl. .................. 709/225; 709/223; 709/229
(58) Field of Classification Search ......... 709/223–226, 709/229, 203
See application file for complete search history.

(56) References Cited

U.S. PATENT DOCUMENTS

| | | | |
|---|---|---|---|
| 6,985,955 B2* | 1/2006 | Gullotta et al. | 709/229 |
| 7,421,281 B2* | 9/2008 | O'Neill et al. | 455/519 |
| 7,464,162 B2* | 12/2008 | Chan | 709/225 |
| 7,574,731 B2* | 8/2009 | Fascenda | 726/2 |
| 7,581,111 B2* | 8/2009 | Wagner et al. | 726/4 |
| 7,793,333 B2* | 9/2010 | Goh et al. | 709/225 |
| 2006/0120526 A1* | 6/2006 | Boucher et al. | 726/29 |
| 2008/0313730 A1* | 12/2008 | Iftimie et al. | 726/17 |
| 2009/0049518 A1* | 2/2009 | Roman et al. | 709/223 |

* cited by examiner

*Primary Examiner*—Philip B Tran
(74) *Attorney, Agent, or Firm*—Brill Law Office; Jeffrey Brill

(57) ABSTRACT

A self access management system allows users to self-grant access rights to resources. An access policy specifies which users have what levels of access to which resources. In addition to specifying conventional access rights, the access policy specifies that at least one user has self management rights to at least one resource. A request from a user to access a resource to which the user does not have conventional access rights is received. The access policy is consulted, to determine whether the user has self management rights to the resource. If so, it is further determined whether criteria specified by the self management rights for accessing the resource are met. Responsive to the criteria being met, the access policy is updated to grant the user access rights to the resource, according to the terms of the self management rights.

20 Claims, 3 Drawing Sheets

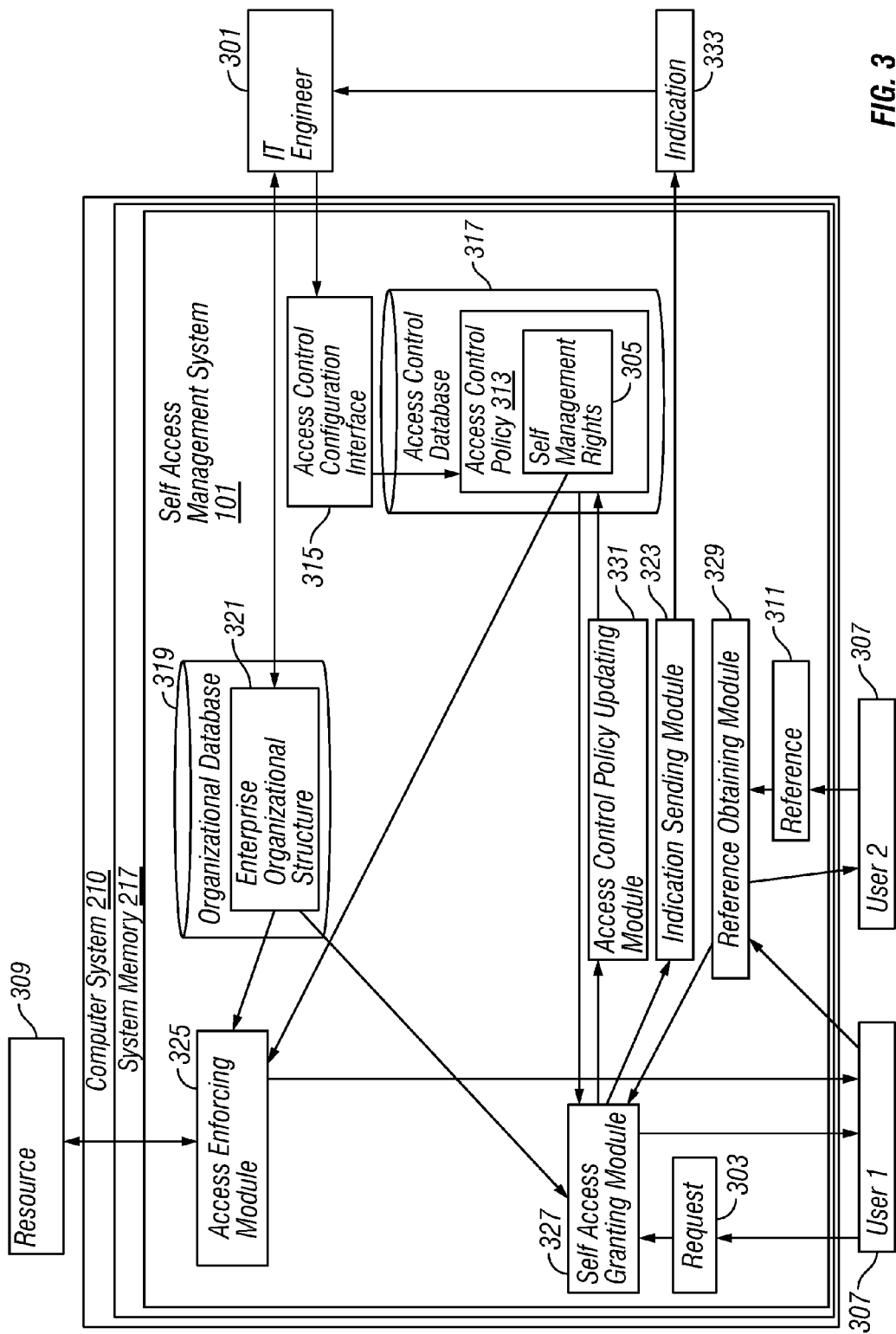

SELF-MANAGEMENT OF ACCESS CONTROL POLICY

TECHNICAL FIELD

This disclosure pertains generally to access control systems, and more specifically to allowing users to self-grant access rights to network resources under appropriate circumstances.

BACKGROUND

Network managers and other IT engineers spend a significant amount of their time responding to user requests for access to network resources. Most of these requests are routine in nature, and they are also usually urgent. Given erratic work hours and geographically distributed project teams, these requests can arrive at any time of day or night. As a result, IT engineers are always on call, and spend a large amount of their time responding to these user requests. This interferes with their ability to perform less urgent but potentially more important longer term projects. In addition, because IT engineers frequently become overwhelmed with access requests, there is often a delay in processing the requests and responding to the users. This is problematic for the users, as the requests are typically urgent in nature. It would be desirable to address these issues.

SUMMARY

A self access management system allows users to self-grant themselves access rights to network resources, under specific circumstances. An IT engineer provides an access control policy which specifies which users have what levels of access rights to which network resources, for example within an enterprise. In addition to specifying conventional user access rights, the access control policy specifies that at least one user has self management rights to at least one network resource. Self management rights allow users to self-grant access rights to the corresponding network resources. A request from a user to access a network resource to which the user does not have conventional access rights is received. The received request can specifically indicate that the user is requesting to self-grant access rights to the network resource. The request can also be directed to an IT engineer, requesting that the user be granted conventional access rights to the network resource, in which case the request is intercepted in route. In either case, the access control policy is consulted, to determine whether the user has self management rights to the network resource. If so, it is further determined whether criteria specified by the self management rights for accessing the network resource are met. This can involve, e.g., determining whether the user occupies a specific position within an enterprise organizational structure, or whether the user requires a reference from a second user with access rights to the network resource. If the user requires such a reference, only in response to receiving the reference from the second user is it determined that the criteria specified by the self management rights for accessing the network resource have been met. Where the criteria specified by the self management rights for accessing the network resource are not met, access rights are not self-granted to the user. On the other hand, responsive to determining that the criteria have been met, the access control policy is updated to grant the user access rights to the network resource, according to the terms of the self management rights. These terms can specify to grant the user limited access rights to the network resource and/or to grant access rights for a limited duration of time, after the occurrence of which the access control policy is again updated to terminate the rights. An indication can be automatically sent to a third party such as the IT engineer, specifying that the user requested self management rights to the network resource, or that the user successfully obtained access to the network resource by using self management rights.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3 is a block diagram of the operation of a self access management system, according to some embodiments.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
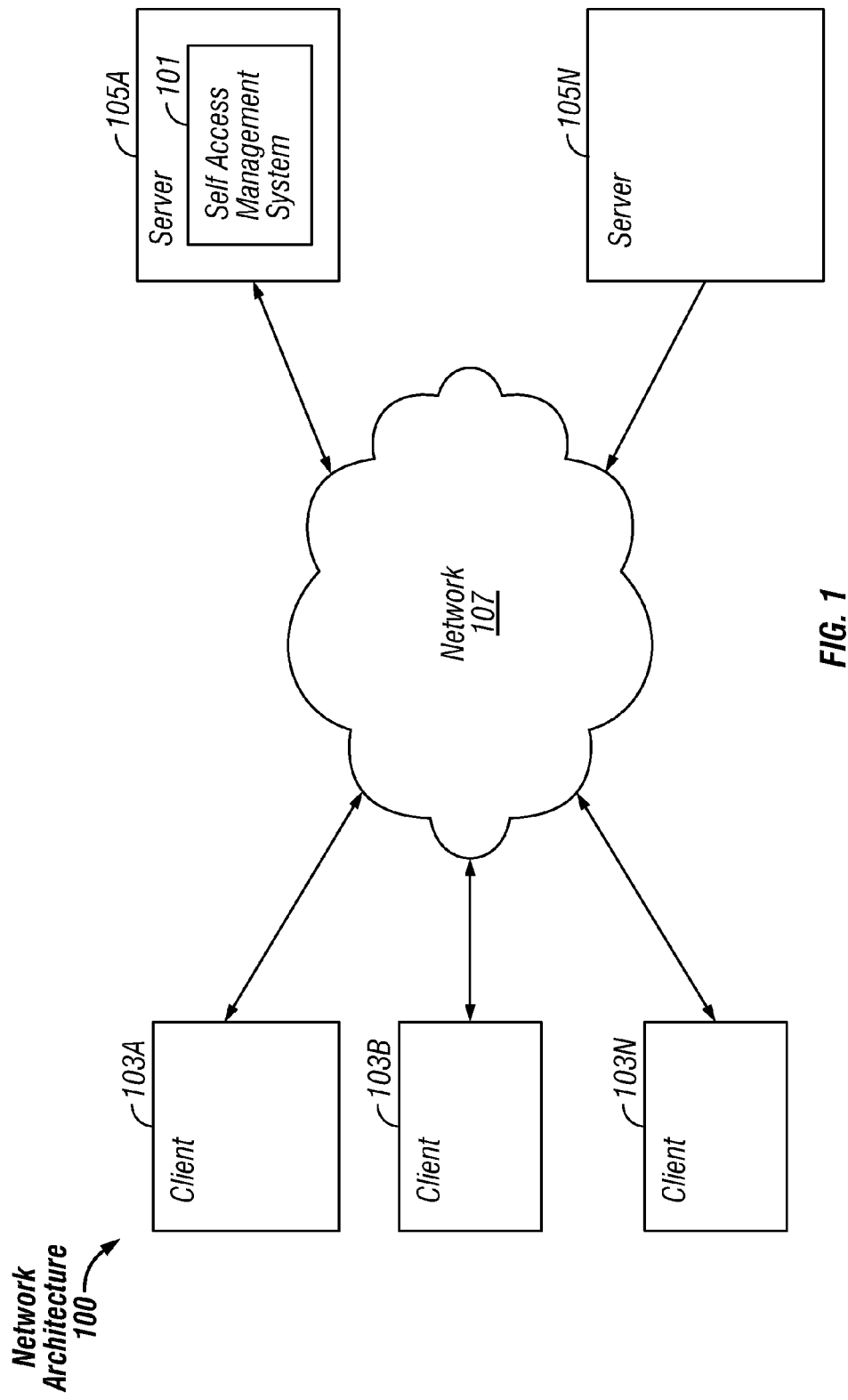
FIG. 1 is a block diagram of an exemplary network architecture in which a self access management system can be implemented, according to some embodiments.

FIG. 1 is a block diagram illustrating an exemplary network architecture 100 in which a self access management system 101 can be implemented. The illustrated network architecture 100 comprises multiple clients 103A, 103B and 103N, as well as multiple servers 105A and 105N. In FIG. 1, the self access management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
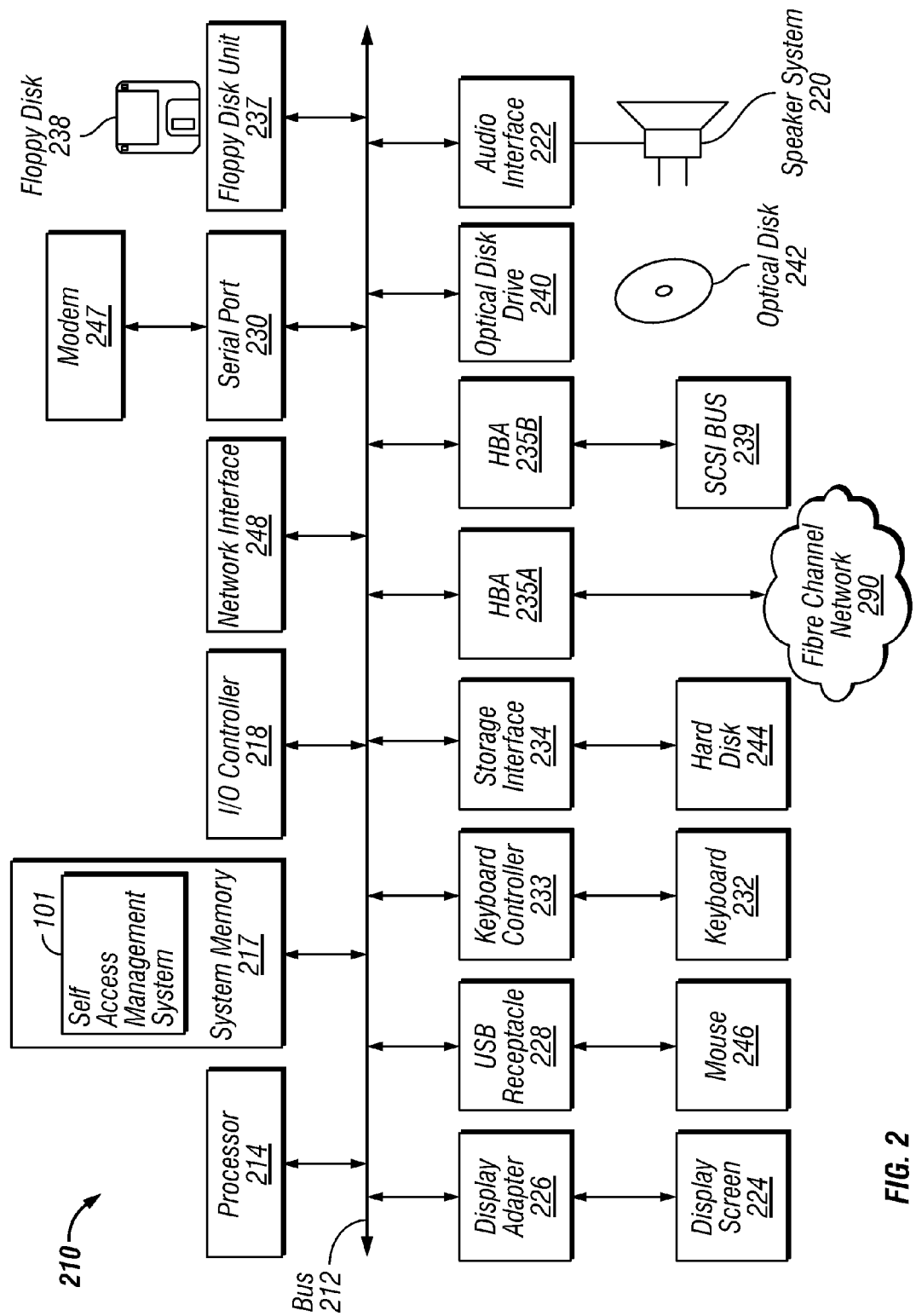
FIG. 2 is a block diagram of a computer system suitable for implementing a self access management system, according to some embodiments.

FIG. 2 is a block diagram of a computer system 210 suitable for implementing a self access management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the self access management system 101 is illustrated as residing in system memory 217. The workings of the self access management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

FIG. 3 illustrates a self access management system 101, residing in the system memory 217 of a computer system 210 according to some embodiments. As described above, the functionalities of the self access management system 101 can reside on a client 103, a server 105, or be distributed between multiple computer systems 210, including within a cloud-based computing environment in which the functionality of the self access management system 101 is provided as a service over a network 107. It is to be understood that although the self access management system 101 is illustrated in FIG. 3 as a single entity, the illustrated self access management system 101 represents a collection of functionalities, which can be instantiated as a single or multiple modules as desired (an instantiation of specific, multiple modules of the self access management system 101 is illustrated in FIG. 3). It is to be understood that the modules of the self access management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the self access management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the self access management system 101 enables users 307, under certain circumstances, to self-grant themselves access to network resources 309 for a limited period of time. To facilitate this, an IT engineer 301 can grant such self management rights 305 to users 307 where appropriate. The granting of such rights 305 can but need not be based on the role of the user 307 within an enterprise organizational hierarchy. The self-granting of access to network resources 309 allows the user 307 to access the resource 309 immediately, thereby meeting the urgent need for access. The IT engineer 301 can then process the access requests 303 after the fact, at a convenient time when the situation is less urgent.

Conventionally, access to network resources 309 is granted to a minimal group of users 307, based on need. The actual group of users 307 who might legitimately desire at least limited access to a given resource 309 at some later time is generally larger. Conventionally each additional user 307 outside of the initial, minimal group desiring access to the resource 309 must make a request 303 to the IT engineer 301. The IT engineer 301 then processes these requests 303 on a case by case basis, as described above.

As illustrated in FIG. 3, when an IT engineer 301 configures a conventional access control policy 313 granting a minimal group of users 307 access to a particular resource 309, the IT engineer 301 can also assign additional users 307 self management rights 305 to that resource 309. Users 307 with self management rights 305 can subsequently self-grant themselves temporary access rights to the resource 309 by going through the proper workflow as described below.

The IT engineer 301 can assign self management rights 305 to an individual user 307 or group of users 307 as desired. The IT engineer 301 may assign self management rights 305 based on organizational relationships as defined, for example, in a corporate organization chart, as decisions concerning the granting of access to users 307 outside of the initial group are often conventionality made based on such relationships. For example, suppose the members of a development team (a group of users 307) are granted read access to a particular file server (a network resource 309). The IT engineer 301 can also grant self management rights 305 to related users 307 and teams, who perhaps should not be granted read access by default, but who are closely related enough in function to the development team so that future access to the file server may become desirable. Users 303 granted self management rights 305 in this scenario could include QA engineers under the same engineering director, developers on other teams in the same division, or anyone above the development team in the management hierarchy. In addition, the IT engineer 301 can (but need not) configure self management rights 305 such that a requesting user 307 must obtain a reference 311 from another user 307 that has conventional access rights to the resource 309 before self-granting himself access. For example, a QA engineer could obtain such a reference 311 from a developer on the team. Self management rights 305 can also be configured without requiring such a reference 311. For example, whereas it might be desirable to require a QA engineer to obtain a reference 311 from a developer before accessing the file server, it is unlikely that such would be required of the CTO.

As illustrated, the IT engineer 301 operates an access control configuration interface 315 in order to configure user access control policy 313 to network resources 309. This access control configuration interface 315 can be in the form of a graphical and/or other type of user interface, such as a command line, configuration file, etc. The IT engineer 301 can use the access control configuration interface 315 to configure conventional access control policy 313, as well as self management rights 305 to resources 309. In granting self management rights 305, the IT engineer 301 can configure which users 307 are to have self management rights 305 to which resources 309, the length of time for which the self management rights 305 are to be effective, whether the user needs a reference 311 to self-grant access, and what level of access can be self-granted (e.g., read only, read-write, read-write-execute, etc.). The IT engineer 301 can configure self management rights differently for different users 307 and resources 309 as desired.

As illustrated, an access rights receiving module 323 receives an access control policy 313 configured via the access control configuration user interface 315. Note that in addition to conventional access rights, the access control policy 313 can also comprise self management rights 305, as configured by the IT engineer 301. The access rights receiving module 323 maintains the received access control policy 313, for example by storing it in an access control database 317 (or other suitable storage mechanism). Note that the IT engineer 301 can update, edit, overwrite and otherwise make changes to the access control policy 313 from time to time, as desired. The access rights receiving module 323 receives and stores such updates. Thus, the access rights receiving module 323 always maintains the current access control policy 313.

As users 307 attempt to access network resources 309, an access enforcing module 325 (instantiated, for example, in the form of conventional access enforcing points) accesses the access control policy 313 stored in the access control database 317, and uses conventional access control functionality to make determinations as to whether to allow particular users 307 access to particular resources 309, based on their access rights. As described in more detail below, a self access granting module 327 also accesses the access control policy 313 from this database 317 to determine whether a particular user 307 can self-grant himself access to a particular resource 309.

As illustrated, an enterprise organizational structure 321 (e.g., a company organizational chart, an enterprise organizational hierarchy, etc.) can be stored in an organizational database 319 (or other storage mechanism). The enterprise organizational structure 321 can comprise information such as reporting structure and job titles. The IT engineer 301, the access enforcing module 325, and the self access granting module 327 can all access the information in the organizational database 319 to verify organizational relationships between users 307, either for creating or enforcing the access control policy 313.

When a user 307 with self management rights 305 to a given network resource 309 wishes to access that resource 305, it is the case that either the user 307 knows or does not know that s/he has self management rights 305. In the first scenario, the user 307 makes a request 303 to the self access granting module 327, which accesses the current access control policy 313 to confirm that the user does have self management rights 305 to the resource. If so, the self access granting module 327 initiates the workflow to grant the user 307 the temporary access to the resource 307, according to the criteria and terms of the self management rights 305. If the self management rights 305 specify that the user 307 needs a reference 311 in order to obtain the rights, the self access granting module 327 so informs the user 307 (e.g., through a user interface, email, SMS, or another form of messaging). The user 307 can then operate a reference obtaining module 329 to request a reference 311 from another user 307 with reference granting authority. This reference 311 request can be made via email, instant messaging, etc., and the user 307 with reference granting authority can send the requested reference 311 to the self access granting module 327 in the same types of ways. If the self management rights 305 specify that the user's 307 access to the network resource 309 is contingent on the user 307 having a certain relationship or position within the enterprise organizational structure 321, the self access granting module 327 can access the enterprise organizational structure 321 from the organizational database 319, and confirm that the user 307 meets the specified criteria.

Once the criteria specified by the access policy are met, the self access granting module 327 grants the user the limited access, as per the terms of the self management rights 305. In order to do so, an access control policy updating module 331 updates the stored access control policy 313 to indicate that the user 307 has the rights in question. The user 307 can subsequently access the network resource 309 according to the terms of the self-granted self management rights 305 without having to disturb the IT engineer 301 in real-time, or wait for the IT engineer 301 to grant conventional access. When a user 307 grants himself access to a resource 309, he will have access for a limited period of time as per the terms of the self management rights 305. This period will be long enough to satisfy his immediate need for access to the resource 309. When the limited period of time has transpired, the access control policy updating module 331 can update the stored access control policy 313 to terminate the user's 307 self-granted access rights.

In some embodiments, an indication sending module 323 automatically sends an indication 333 to the IT engineer 301 that the user 307 has requested or successfully administered self management rights 305 for the resource 309. The IT engineer 301 can process these indications 333 in a convenient way at a convenient time, for example in batch during regular business hours.

In a case during which the user 307 does not know that s/he has self management rights 305 to the resource 309, the user 307 simply sends a request 303 to be given conventional access rights to the IT engineer 301. In some embodiments, the self access granting module 327 intercepts such requests 303, and determines if the requesting user 307 has self management rights 305 to the target resource 309. If not, the request 303 is simply passed on to the IT engineer 301. However, where the user 303 in question does have self management rights 305 to the resource 309, the self access granting module 327 communicates this information back to the user 307 (e.g., via user interface, email, instant message, etc.), and initiates the workflow for the self-granting process described above.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for allowing self-granting of access rights to network resources, the method comprising the steps of:
   receiving, by a computer, an access control policy specifying which of a plurality of users have what access rights to which of a plurality of network resources, the access control policy specifying that at least one user has self management rights to at least one network resource;
   receiving, by a computer, a request from a user to access at least one network resource to which the user does not have conventional access rights;
   determining, by a computer, based on the access control policy, that the user has self management rights to the at least one network resource;
   determining, by a computer, whether criteria specified by the self management rights for accessing the at least one network resource are met; and
   determining, by a computer, whether to grant the user access rights to the at least one network resource responsive to whether criteria specified by the self management rights for accessing the at least one network resource are met.

2. The method of claim 1 wherein receiving, by a computer, a request from a user to access at least one network resource to which the user does not have conventional access rights further comprises:
   receiving, by a computer, a request from a user to self-grant access rights to the at least one network resource.

3. The method of claim 1 wherein receiving, by a computer, a request from a user to access at least one network resource to which the user does not have conventional access rights further comprises:
   intercepting, by a computer, a request from a user to be granted access rights to the at least one network resource.

4. The method of claim 1 wherein determining, by a computer, whether criteria specified by the self management rights for accessing the at least one network resource are met further comprises:
   determining, by a computer, whether the user occupies a specific position within an enterprise organizational structure.

5. The method of claim 1 wherein determining, by a computer, whether criteria specified by the self management rights for accessing the at least one network resource are met further comprises:
   determining, by a computer, that the user requires a reference from a second user with access rights to the at least one network resource.

6. The method of claim 5 further comprising:
   responsive to receiving a reference from a second user with access rights to the at least one network resource, determining, by a computer, that the criteria specified by the self management rights for accessing the at least one network resource are met.

7. The method of claim 5 further comprising:
   responsive to not receiving a reference from a second user with access rights to the at least one network resource, determining, by a computer, that the criteria specified by the self management rights for accessing the at least one network resource are not met.

8. The method of claim 1 further comprising:
   responsive to determining, by a computer, that the criteria specified by the self management rights for accessing the at least one network resource are met, updating the access control policy, by a computer, to grant the user access rights to the at least one network resource, according to terms of the self management rights.

9. The method of claim 8 wherein updating the access control policy, by a computer, to grant the user access rights to the at least one network resource, according to the terms of the self management rights, further comprises:
   updating the access control policy, by a computer, to grant the user access rights to the at least one network resource for a limited duration of time, according to the terms of the self management rights.

10. The method of claim 9 further comprising:
    responsive to occurrence of the limited duration of time, updating the access control policy, by a computer, to terminate the access rights granted to the user to the at least one network resource.

11. The method of claim 8 wherein updating the access control policy, by a computer, to grant the user access rights to the at least one network resource, according to the terms of the self management rights, further comprises:
    updating the access control policy, by a computer, to grant the user limited access rights to the at least one network resource, according to the terms of the self management rights.

12. The method of claim 1 further comprising:
    automatically sending, by a computer, an indication to a third party that the user requested self management rights to the at least one network resource.

13. The method of claim 1 further comprising:
    automatically sending, by a computer, an indication to a third party that the user successfully obtained access to the at least one network resource by using self management rights.

14. At least one non-transitory computer readable storage medium storing a computer program product for allowing self-granting of access rights to network resources, the computer program product comprising:
    program code for receiving an access control policy specifying which of a plurality of users have what access rights to which of a plurality of network resources, the access control policy specifying that at least one user has self management rights to at least one network resource;

program code for receiving a request from a user to access at least one network resource to which the user does not have conventional access rights;

program code for determining, based on the access control policy, that the user has self management rights to the at least one network resource;

program code for determining whether criteria specified by the self management rights for accessing the at least one network resource are met; and program code for determining whether to grant the user access rights to the at least one network resource responsive to whether criteria specified by the self management rights for accessing the at least one network resource are met.

15. The computer program product of claim 14 wherein the program code for determining whether criteria specified by the self management rights for accessing the at least one network resource are met further comprises:

program code for determining whether the user occupies a specific position within an enterprise organizational structure.

16. The computer program product of claim 14 wherein the program code for determining whether criteria specified by the self management rights for accessing the at least one network resource are met further comprises:

program code for determining that the user requires a reference from a second user with access rights to the at least one network resource;

program code for, responsive to receiving a reference from a second user with access rights to the at least one network resource, determining that the criteria specified by the self management rights for accessing the at least one network resource are met; and program code for, responsive to not receiving a reference from a second user with access rights to the at least one network resource, determining that the criteria specified by the self management rights for accessing the at least one network resource are not met.

17. The computer program product of claim 14 further comprising:

program code for, responsive to determining that the criteria specified by the self management rights for accessing the at least one network resource are met, updating the access control policy to grant the user access rights to the at least one network resource, according to terms of the self management rights;

program code for updating the access control policy to grant the user access rights to the at least one network resource for a limited duration of time, according to the terms of the self management rights;

program code for, responsive to occurrence of the limited duration of time, updating the access control policy to terminate the access rights granted to the user to the at least one network resource; and program code for updating the access control policy to grant the user limited access rights to the at least one network resource, according to the terms of the self management rights.

18. The computer program product of claim 14 further comprising:

program code for automatically sending an indication to a third party that the user requested self management rights to the at least one network resource.

19. The computer program product of claim 14 further comprising:

program code for automatically sending an indication to a third party that the user successfully obtained access to the at least one network resource by using self management rights.

20. A computer system configured to allow self-granting of access rights to network resources, the computer system comprising:

a processor;

a system memory;

an access rights receiving module configured to receive an access control policy specifying which of a plurality of users have what access rights to which of a plurality of network resources, the access control policy specifying that at least one user has self management rights to at least one network resource; and a self access granting module configured to:
1) receive a request from a user to access at least one network resource to which the user does not have conventional access rights;
2) determine, based on the access control policy, that the user has self management rights to the at least one network resource;
3) determine whether criteria specified by the self management rights for accessing the at least one network resource are met; and
4) determine whether to grant the user access rights to the at least one network resource responsive to whether criteria specified by the self management rights for accessing the at least one network resource are met.

* * * * *